(12) United States Patent
Velummylum et al.

(10) Patent No.: US 8,997,131 B1
(45) Date of Patent: Mar. 31, 2015

(54) ADVERTISEMENTS FOR RECORDED CONTENT

(75) Inventors: Piragash Velummylum, Seattle, WA (US); Johanna S. Olson, Bellevue, WA (US); Korwin J. Smith, Seattle, WA (US); James H. Wood, Seattle, WA (US); Wenlin Ma, Seattle, WA (US); Christopher G. Emery, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 242 days.

(21) Appl. No.: 13/194,464

(22) Filed: Jul. 29, 2011

(51) Int. Cl.
*H04N 7/16* (2011.01)
*H04N 7/10* (2006.01)
*H04N 7/025* (2006.01)
*H04N 21/232* (2011.01)

(52) U.S. Cl.
CPC .................................. *H04N 21/232* (2013.01)
USPC .................................... 725/1; 725/32; 725/35

(58) Field of Classification Search
CPC . H04N 21/235; H04N 21/435; H04N 21/812; H04N 21/8146; H04N 21/4532; H04N 21/25883; H04N 21/25891
USPC ............. 725/8, 22–23, 32, 34–36; 705/14.25, 705/14.4, 14.41, 14.42, 14.49, 14.51, 14.53, 705/14.57, 14.58, 14.66, 14.67, 14.73, 26.7
See application file for complete search history.

(56) References Cited

U.S. PATENT DOCUMENTS

| | | | |
|---|---|---|---|
| 7,624,412 B2 * | 11/2009 | McEvilly et al. | 725/46 |
| 7,757,265 B2 * | 7/2010 | Reynolds et al. | 725/36 |
| 2003/0039465 A1 * | 2/2003 | Bjorgan et al. | 386/20 |
| 2003/0105682 A1 * | 6/2003 | Dicker et al. | 705/27 |
| 2003/0126611 A1 * | 7/2003 | Chernock et al. | 725/105 |

* cited by examiner

*Primary Examiner* — Hai V Tran
(74) *Attorney, Agent, or Firm* — Thomas | Horstemeyer, LLP

(57) ABSTRACT

Disclosed are various embodiments for providing advertisements in association with recorded media items. For example, a broadcast media item is stored in a networked storage system in association with an account of a user for later consumption. At least one marker is located in the broadcast media item that identifies a first advertisement in the broadcast media item. One of a plurality of second advertisements is selected that targets the user to replace the first advertisement. The first advertisement is replaced with the selected one of the second advertisements in the broadcast media item.

22 Claims, 4 Drawing Sheets

ADVERTISEMENTS FOR RECORDED CONTENT

BACKGROUND

People often use digital video recording technology to record broadcast television shows that they cannot watch at the time of broadcasting so that they can watch such shows later. Advertisements in such shows may not be relevant to users and may not allow a user to take action with respect to such advertisements immediately when viewed.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

DETAILED DESCRIPTION

The present disclosure relates to including advertisements in recorded media items such as television shows and the like. Media items may be locally recorded by users and stored in remote networked storage system such as a cloud storage system. When stored in the cloud, more relevant advertisements may be substituted for existing advertising content in such media items. To this end, the online purchasing history, browsing history, and other information about a user may be employed to identify advertisements that more specifically target customers that recorded the media item to the remote networked storage system. In addition, such advertisements may include various graphical components such as buttons and the like that, when manipulated, cause various actions to occur within an electronic commerce system with respect to items presented in such substituted advertisements. In the following discussion, a general description of the system and its components is provided, followed by a discussion of the operation of the same.

Figure 1:
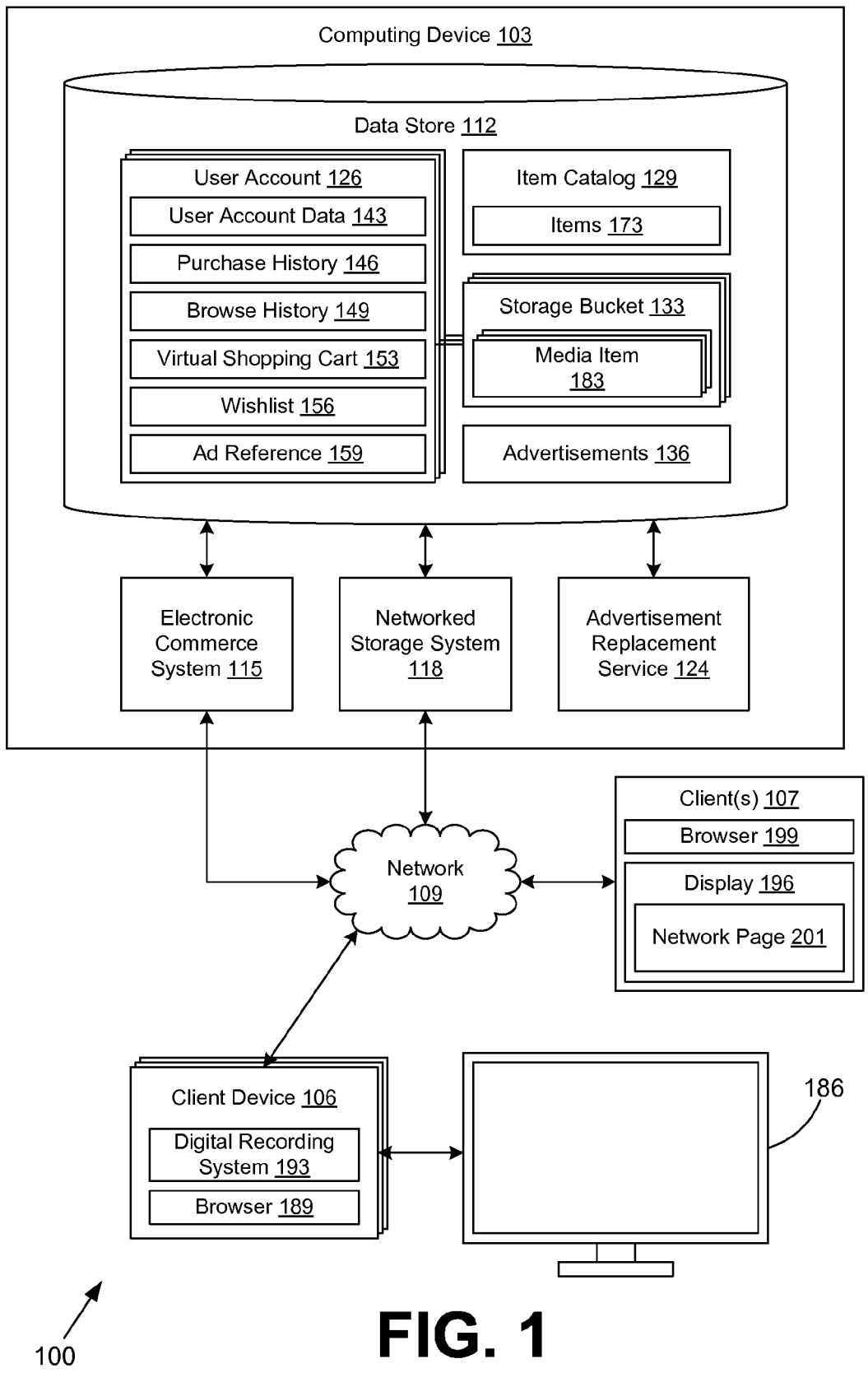
FIG. 1 is a drawing of a networked environment according to various embodiments of the present disclosure.

With reference to FIG. 1, shown is a networked environment 100 according to various embodiments. The networked environment 100 includes one or more computing devices 103 in data communication with one or more clients 106 and 107 by way of a network 109. The network 109 includes, for example, the Internet, intranets, extranets, wide area networks (WANs), local area networks (LANs), wired networks, wireless networks, or other suitable networks, etc., or any combination of two or more such networks.

The computing device 103 may comprise, for example, a server computer or any other system providing computing capability. Alternatively, a plurality of computing devices 103 may be employed that are arranged, for example, in one or more server banks or computer banks or other arrangements. For example, a plurality of computing devices 103 together may comprise a cloud computing resource, a grid computing resource, and/or any other distributed computing arrangement. Such computing devices 103 may be located in a single installation or may be distributed among many different geographical locations. For purposes of convenience, the computing device 103 is referred to herein in the singular. Even though the computing device 103 is referred to in the singular, it is understood that a plurality of computing devices 103 may be employed in the various arrangements as described above.

Various applications and/or other functionality may be executed in the computing device 103 according to various embodiments. Also, various data is stored in a data store 112 that is accessible to the computing device 103. The data store 112 may be representative of a plurality of data stores 112 as can be appreciated. The data stored in the data store 112, for example, is associated with the operation of the various applications and/or functional entities described below.

The components executed on the computing device 103, for example, include an electronic commerce system 115, a networked storage system 118, an advertisement replacement service 124, and other applications, services, processes, systems, engines, or functionality not discussed in detail herein.

The electronic commerce system 115 is executed in order to facilitate the online purchase of media items over the network 109. The electronic commerce system 115 also performs various backend functions associated with the online presence of a merchant in order to facilitate the online purchase of various items such as good, services, media items, and other items. For example, the electronic commerce system 115 may generate network pages or portions thereof that are provided to clients 106/107 for the purposes of selecting items for purchase, rental, download, lease, or other forms of consumption.

The networked storage system 118 is executed to maintain a file hierarchy of files and folders in networked or metadata-based file systems for users. The networked storage system 118 may be regarded as maintaining a file system for each of the users of the system. To this end, the networked storage system 118 may support various file-related operations such as, for example, creating files, deleting files, modifying files, setting permissions for files, downloading files, and/or other operations. The networked storage system 118 may be configured to maintain a record of file activity, e.g., uploading of files, downloading of files, deletion of files, preview of files, etc. The networked storage system 118 may be configured to serve up data addressed by uniform resource locator (URL) via hypertext transfer protocol (HTTP).

In some embodiments, the networked storage system 118 may correspond to a virtual file system where the actual data objects of the files are stored in a separate data storage system. A metadata service may be used to associate metadata with the files, thereby facilitating searches of the files using the metadata. By storing files in such a networked storage system 118, users may access the files from any client 106 or 107 with connectivity to the network 109.

A metadata service may be executed in association with or as part of the networked storage system 118 to maintain metadata items in association with files. To this end, such a metadata service may support various operations such as, for example, creating metadata items, deleting metadata items, retrieving metadata items, searching on metadata items, and/or other operations. The metadata service may also implement one or more searchable indices of the metadata items. It is noted that the networked file system associated with each user storage account in the networked storage system 118 may be a metadata-based file system such as that described by U.S. patent application Ser. No. 13/036,539 entitled "META-DATA-BASED FILE SYSTEM," which was filed on Feb. 28, 2011 and is incorporated herein by reference in its entirety.

The advertisement replacement service 124 is executed to replace advertisements in media items such as broadcast media items that are stored in the data store 112 by the networked storage system 118 as will be described.

The data stored in the data store 112 includes user accounts 126, an item catalog 129, storage buckets 133, advertisements 136, and potentially other data. Associated with each user account 126, for example, is various data associated with the activity of a respective user with respect to the electronic commerce system 115. Such data includes user account data 143, a purchase history 146, a browse history 149, a virtual shopping cart 153, a wishlist 156, an advertisement reference 159, and potentially other information. The item catalog 129 includes a listing of items 173 that are sold through the electronic commerce system 115. Stored within each of the storage buckets 133 are media items 183 such as broadcast media items as will be described. In addition, other types of files may be stored in the storage buckets 133 in association with the operation of the networked storage system 118.

The user account data 143 may include information about users that purchase items 173 through the electronic commerce system 115 and that store files such as the media item 183 in a storage bucket 133 in the networked storage system 118. Such information may comprise, for example, name, billing addresses, shipping addresses, payment instruments, and other information. Account settings may be employed to specify and track various functionality with respect to a given account such as passwords, security credentials, file management permissions, storage quotas and limitations, authorized access applications, billing information, and/or other data. The user account data 143 may also include profile or demographic data associated with users such as age, gender, address, and other such information. Where multiple users are associated with a given user account 126, the user account data 143 may include information about each person such as might be the case were members of a family use a common user account 126.

The purchase history 146 includes a compilation of all of the purchases that the user has made over time through the electronic commerce system 115. Given that the electronic commerce system 115 provides for online commerce such as, for example, selling items through a network site, all of the purchases made by a given customer may be stored in their purchase history 146 associated with their user account 126.

Similarly, the browse history 149 includes a history of the various network pages or other content viewed by a customer when accessing a network site or other networked content associated with the electronic commerce system 115 to browse through various items 173 they may wish to purchase over time.

The virtual shopping cart 153 is a listing of items 173 with which a user may proceed through a checkout process to purchase as can be appreciated. The virtual shopping cart 153 may be employed by a given user in association with their purchase activity through the electronic commerce system 115. The virtual shopping cart 153 may be segmented to include items 173 that are currently designated for purchase, items 173 that are saved for later purchase, and other designations.

The wishlist 156 includes a listing of items 173 that the user has expressed a desire or interest in purchasing at some point in the future. Alternatively, the user may store items 173 in wishlist 156 for other purposes.

The ad reference 159 comprises information about a given advertisement 136 in which a user has indicated interest. To this end, when the user accesses a network site through the electronic commerce system 115, the user may examine advertisements 136 and other content associated with such advertisements 136 that are noted by the ad reference 159 for reasons that will be described below.

The item catalog 129 includes a listing of all of the items 173 that are sold through the electronic commerce system 115. Such items 173 may be goods, services, media items, or other items as can be appreciated.

In one embodiment, the files such as the media item 183 are stored in the storage buckets 133 of the networked storage system 118. Where the same media item 183 is stored for multiple users in different file systems, the same data may be referred to by each of the different file systems. If the copy of the media item 183 is modified, the media item 183 may then be replicated (e.g., a "copy-on-write" system). In other embodiments, a separate copy of the media item 183 may be maintained for each different file system.

The advertisements 136 include various media that provide for advertisement of items 173. Also, the advertisements 136 may relate to subject matter beyond the items 173 sold through the electronic commerce system 115. According to one embodiment, select ones of the advertisements 136 may be inserted into the media items 183, or used to replace previously existing advertisements in the media items 183, that are stored in storage bucket 133. According to one aspect, the media items 183 are stored in respective storage buckets 133 by the digital recording systems 193 as will be described.

The client device 106 is representative of a plurality of client devices that may be coupled to the network 109. The client device 106 may comprise, for example, a processor-based system such as a computer system. Such a computer system may be embodied in the form of a digital video recorder such as TiVo™, a cable company DVR, or other like devices on the market. Alternatively, the computer system of the client may be embodied in the form of a desktop computer, a laptop computer, personal digital assistants, cellular telephones, smartphones, set-top boxes, music players, web pads, tablet computer systems, game consoles, electronic book readers, or other devices with like capability.

The client device 106 is coupled to a display device 186. The display device 186 comprises, for example, a television or other monitor that may comprise, for example, one or more display technologies such as cathode ray tubes (CRTs), liquid crystal display (LCD) screens, gas plasma-based flat panel displays, LCD projectors, or other types of display devices, etc. The display device 186 generates video images as can be appreciated, where accompanying audio signals may be generated on speakers associated with the display device 186 as can be appreciated.

The client device 106 may be configured to execute various applications such as a browser 189, a digital recording system 193, and/or other applications. The digital recording system 193 is configured to record broadcast media items 183 and the like and to generate an audio/video signal that is provided to the display device 186.

The browser 189 may be executed in the client device 106, for example, to access and render network pages, such as web pages, or portions thereof, or other network content served up by the computing device 103 and/or servers. The network pages, or portions thereof may be superimposed over video of the broadcast media items. The client device 106 may be configured to execute applications beyond the browser 189 such as, for example, email applications, instant message applications, and/or other applications.

The client 107 is representative of a plurality of client devices that may be coupled to the network 109. The client 107 may comprise, for example, a processor-based system such as a computer system. Such a computer system may be embodied in the form of a desktop computer, a laptop computer, personal digital assistants, cellular telephones, smartphones, set-top boxes, music players, web pads, tablet computer systems, game consoles, electronic book readers, or other devices with like capability. The client 107 may include a display device 196. The display 196 may comprise, for example, one or more devices such as cathode ray tubes (CRTs), liquid crystal display (LCD) screens, gas plasma-based flat panel displays, LCD projectors, or other types of display devices, etc.

The client 107 may be configured to execute various applications such as a browser 199 and/or other applications. The browser 199 may be executed in a client 107, for example, to access and render network pages, such as web pages, or other network content served up by the computing device 103 and/or other servers, thereby rendering a network page 201 on the display 196. The client 107 may be configured to execute applications beyond the browser 199 such as, for example, email applications, instant message applications, and/or other applications.

Next, a general description of the operation of the various components of the networked environment 100 is provided. To begin, assume that a user employs the client device 106 to record a media item 183 that normally would be viewed on the display device 186. Specifically, the media item 183 may be a broadcast media item 183 comprising a television show with advertisements. However, rather than viewing the media item 183, assume that the user has programmed the digital recording system 193 to save the media item 183 for later viewing.

According to one embodiment, the digital recording system 193 is configured to interface with the networked storage system 118 to store the media item 183 in a storage bucket 133 associated with the respective user who owns and operates the client device 106. By doing so, the media item 183 is thus available for the user to download to the client device 106 at their leisure for viewing.

Once the media item 183 is stored by the user in their respective storage bucket 133, then according to various embodiments the advertisement replacement service 124 is configured to analyze the media item 183 to locate one or more previously existing advertisements included therein. To this end, various tags or references may be embedded within the media item 183 that indicate the beginning and end of various advertisements as can be appreciated. In addition, other approaches to identifying advertisements within the media item 183 may be employed.

Thereafter, the advertisement replacement service 124 analyzes one or more advertisements within the media item 183 to determine whether they are eligible for replacement. It may be the case that some previously existing advertisements should be left within the media item 183 for various reasons. For example, it may be the case that the party who generates the media item 183 mandates that certain advertisements are to remain in place. Also, it may be deemed that all advertisements that address a national audience are to be left in the media item 183, and any local advertisements may be subject to replacement.

This may reflect the fact that the media item 183 may not be rendered in various locations where such local advertisements are relevant. According to various embodiments, various techniques may be employed to determine whether advertisements are targeted toward a national or local audience. In one approach, an audio track associated with a given advertisement may be analyzed to determine whether it mentions local entities, thereby indicating the respective advertisement is likely targeted toward a local audience. Alternatively, other approaches may be employed.

Assuming that the advertisement replacement service 124 determines that an original advertisement within the media item 183 should be replaced, then the advertisement replacement service 124 proceeds to identify a replacement advertisement for the previously existing advertisement within the media item 183 based on information associated with the user who caused the media item 183 to be uploaded to the respective storage bucket 133.

To this end, the user has a single user account 126 to facilitate their interaction with the electronic commerce system 115 and their use of the networked storage system 118. To this end, the advertisement replacement service 124 has access to all the information associated with the user account 126 that may be analyzed to identify an advertisement 136 that is particularly targeted to the interests, purchasing habits, browsing habits, and other demographic information known about the respective user. By virtue of having access to such information, the advertisement replacement service 124 may select one of the advertisements 126 to replace the original advertisement within the media item 183 that is highly targeted toward the user.

In addition, the advertisement replacement service 124 may associate one or more links with the replacement advertisement 136. According to various embodiments, when such links are manipulated, corresponding actions are initiated within the electronic commerce system 115 with respect to an item 173 sold through the electronic commerce system, or with respect to some other aspect to the electronic commerce system 115.

Such actions may comprise, for example, placing an item 173 into the virtual shopping cart 153 of the user, placing an item 173 into a wishlist 156, implementing the purchase of an item 173, storing an advertisement reference 159 in association with the user account 126 of the user, or some other action. In storing the advertisement reference 159, such reference may facilitate the user viewing the corresponding advertisement 136 or an item 173 presented in such advertisement when browsing a network site facilitated by the electronic commerce system 115 at a later time by manipulating the browser 199 and the client 107 as can be appreciated. For example, an item 173 associated with the advertisement 136 referenced by the advertisement reference 159 may be depicted on a network page 201 such as, for example, a home page or item landing page.

Once one or more links are associated with the advertisement 136 that is inserted into the media item 183, then when requested by the digital recording system 193 in the client device 106, the networked storage system 118 may provide the stored media item 183 from the respective storage bucket 133 of the user back to the client device 106. Such media item 183 may then be rendered on the display device 186 as can be appreciated. In addition, the browser 189 within the client device 106 may superimpose the various links mentioned above over the view of the advertisement 136 when it is rendered so the user may manipulate the respective links or other components depicted. When such links are followed, appropriate messages are sent from the client device 106 to the electronic commerce system 115 to initiate one of the various actions mentioned above, or to implement some other action with respect to the electronic commerce system 115.

Figure 2:
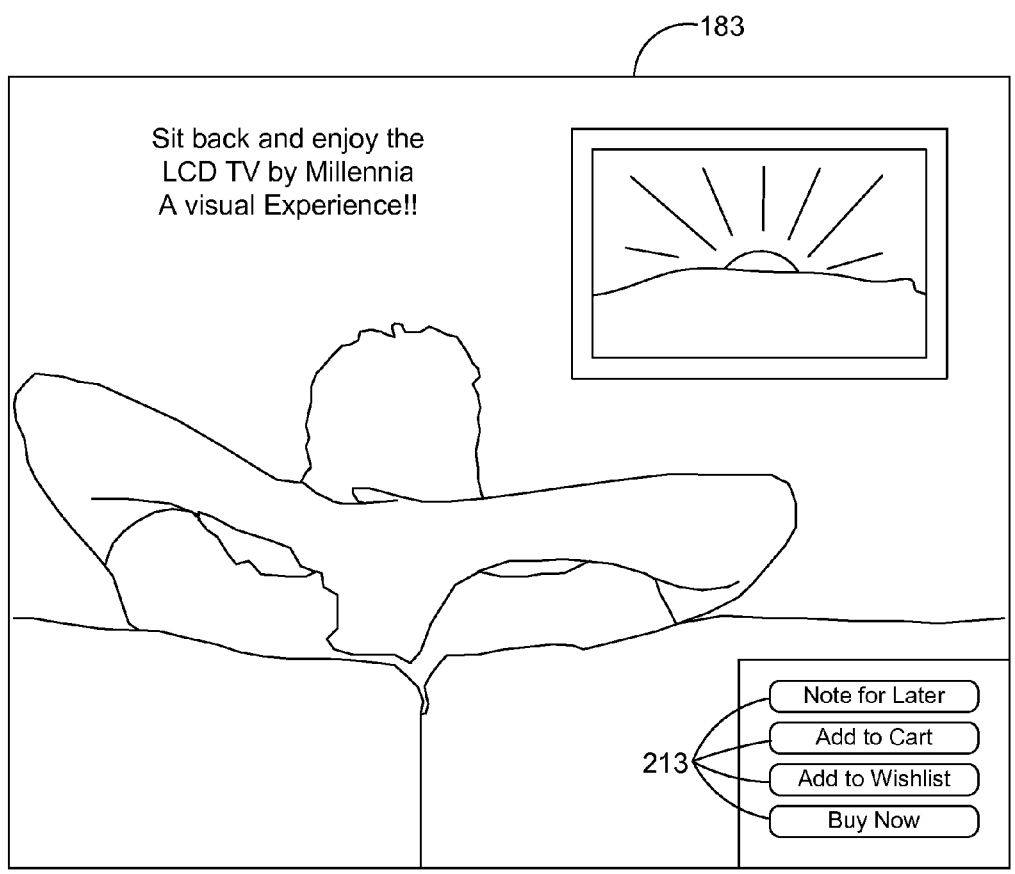
FIG. 2 is a drawing of a rendering of a media item on a device in the networked environment of FIG. 1 according to various embodiments of the present disclosure.

With reference to FIG. 2, shown is an example of a portion of media item 183 that depicts an advertisement 136 (FIG. 1) inserted into the media item 183. Specifically, the media item 183 comprises an advertisement for an LCD TV and includes a number of graphical components 213 that are superimposed over the media item 183 by the browser 189 (FIG. 1) on the client device 106 (FIG. 1) to provide for various functions with respect to the electronic commerce system 115 (FIG. 1) on the part of the customer who views the media item 183. Specifically, the graphical components 213 may be associated with the links that initiate various actions with respect to the electronic commerce system 115 as will be described.

Figure 3A:
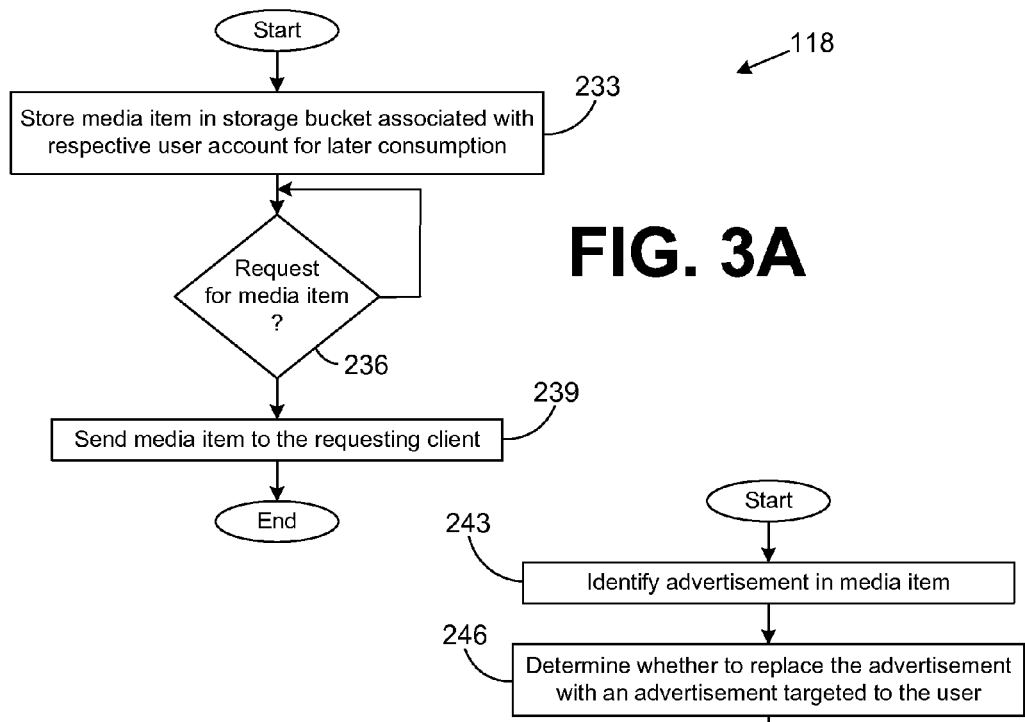
FIGS. 3A, 3B, and 3C are flowcharts illustrating examples of functionality implemented as portions of systems and services executed in a computing device in the networked environment of FIG. 1 according to various embodiments of the present disclosure.
Figure 3B:
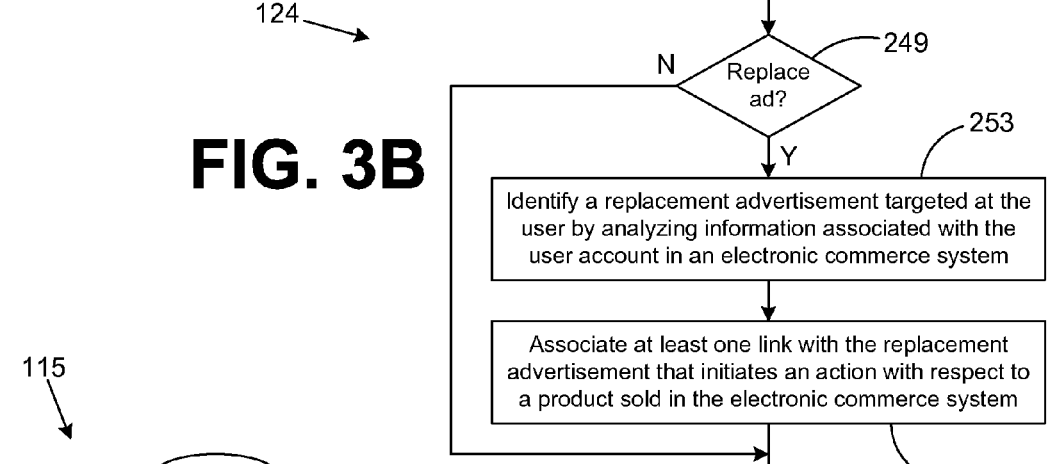
Figure 3C:
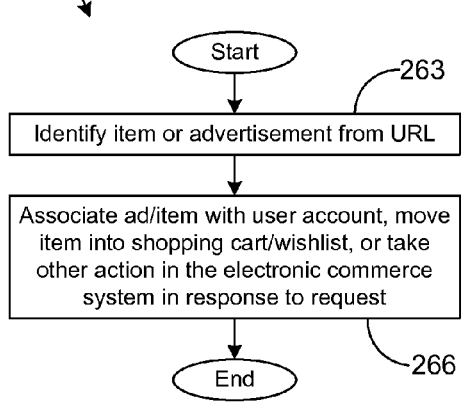

Referring next to FIGS. 3A, 3B, and 3C, shown are flowcharts that provide examples of the operation of various portions of the electronic commerce system 115, the networked storage system 118, and the advertisement replacement service 124 according to various embodiments. It is understood that the flowchart of FIG. 5 provides merely an example of the many different types of functional arrangements that may be employed to implement the operation of the portion of the electronic commerce system 115, the networked storage system 118, and/or the advertisement replacement service 124 as described herein. As an alternative, each of the flowcharts of FIG. 5 may be viewed as depicting an example of steps of a method implemented in the computing device 103 (FIG. 1) according to one or more embodiments.

FIG. 3A depicts the functionality of a networked storage system 118 according to various embodiments. Specifically, FIG. 3A depicts functionality of the networked storage system 118 in storing the media item 183 (FIG. 1) in a respective storage bucket 133 (FIG. 1), and in serving up the media item 183 back to the client device 106 (FIG. 1) to be rendered for the user as described above.

Beginning with box 233, the networked storage system 118 stores the media item 183 received from the client device 106 in the respective storage bucket 133 associated with the respective user account 126 (FIG. 1) of such user for later consumption. To this end, the client device 106 may send a request for storage of the media item 183 and may send the media item 183 to the networked storage system 118 for storage in the respective storage bucket 133. The digital recording system 193 may be configured interact with the networked storage system 118 using a predefined protocol to ensure that the media item 183 is stored in to the respective storage bucket 133 of the user. According to one embodiment, such media items 183 may comprise broadcast media items 183.

Once the media item 183 is stored, the networked storage system 118 waits in box 236 for a request for such media item 183 from the client device 106. Assuming that a request is received at a later time when the user wishes to view such media item 183, then in box 239, the networked storage system 118 sends the media item 183 to the requesting client device 106 to be rendered by the digital recording system 193 on the display device 186 can be appreciated.

Referring next to FIG. 3B, shown is an example of functionality of the advertisement replacement service 124 according to various embodiments. To this end, functionality of the advertisement replacement service 124 depicted in FIG. 3B is implemented to potentially replace the previously existing advertisements in a given media item 183 (FIG. 1) with new advertisements 136 (FIG. 1) as described above.

Beginning with box 243, the advertisement replacement service 124 identifies the advertisements that exist within media item 183 received from a client device 106 (FIG. 1). This may be done, for example, by identifying markers within the media item 183 that indicate the begin and end points of a given advertisement within the media item 183.

Thereafter, in box 246, the advertisement replacement service 124 determines whether to replace such advertisement with one of the advertisements 136 that are targeted to the user. The advertisement replacement service 124 may be configured to employ predefined criteria to determine whether a given advertisement is to be replaced. For example, one criterion is to replace all advertisements that are directed to a local audience. Consequently, the advertisement replacement service 124 may first determine whether the previously existing advertisement within the media item 183 is targeted to national or local audience, where local advertisements are replaced. This may be done by analyzing the audio track associated with such media item 183 for clues as to whether a national or local audience is targeted.

To accomplish this, various speech recognition algorithms may be employed to identify the text of the audio track to determine whether the advertisement is directed to a national or local audience. The text may be analyzed for local content to determine whether the advertisement is local or national in scope.

Alternatively, the previously existing advertisements in the media item 183 may be marked for replacement by a studio that generates the media item 183 or some other approach to determine whether the advertisements within media item 183 are to be replaced. In box 249, if the previously existing advertisement within the media item 183 is to be replaced, then the advertisement replacement service 124 proceeds to box 253. Otherwise, the advertisement replacement service 124 ends as shown.

In box 253, the advertisement replacement service 124 identifies a replacement advertisement that is targeted toward the customer by analyzing information associated with the respective user account 126 (FIG. 1) that facilitates or tracks the interaction of the user with both the electronic commerce system 115 and the networked storage system 118. The information to be analyzed may include the user account data 143 (FIG. 1), the purchase history 146 (FIG. 1), the browse history 149 (FIG. 1), items 173 (FIG. 1) listed in the shopping cart 153 (FIG. 1), items 173 listed in the wishlist 156 (FIG. 1), or other information that may be stored by the user in association with their user account 126.

The items 173 purchased or viewed as indicated by the purchase history 146 or the browse history 149 may indicate a general interest of the user, where an advertisement 136 that aligns with such interest may be identified as targeting the user. Also, items 173 that have been placed in the virtual shopping cart 153 and the wishlist 156 may also indicate the interest of the user in such items 173, where advertisements 136 relevant to such items 173 may be identified as targeting the user. In addition, there are other approaches to targeting advertisements 136 to a user given the information in the user account 126.

Assuming that a replacement advertisement has been identified in box 253, then in box 256 the advertisement replacement service 124 associates one or more links with the replacement advertisement, where the links initiate an action in the electronic commerce system with respect to an item 173 or some other action within the electronic commerce system as described above.

Such action may be, for example, placing an item 173 in a virtual shopping cart 153 of the user, placing an item 173 in a wishlist 156 of the user, or some other action. In addition, it may be the case that when watching the media item 183 on the display device 186, for example, the user may not wish to interrupt their viewing experience to investigate an advertisement 136 even though the advertisement 136 may present an item 173 in which the user is interested.

Accordingly, one of the links associated with the advertisement 136 may cause the electronic commerce system 115 to store an advertisement reference 159 (FIG. 1) in association with the user account 126 that refers to the respective advertisement 136. At a later time, the user may employ the client 107 to access a network site through the electronic commerce system 115 to review the advertisement 136 or items 173 presented in such advertisement as can be appreciated. Specifically, the advertisement reference 159 may be consulted by the electronic commerce system 115 in generating a network page 201 (FIG. 1) such as a home network page in order to present the items 173 in such network page 201 for further review by the user. Alternatively, the advertisement 136 itself may be presented, for example, in a window in such a network page 201.

In addition, other actions may be taken with respect to the electronic commerce system 115 in response the manipulation of an appropriate link associated with an advertisement 136 associated with the media item 183. When such links are manipulated, the browser 189 within the client device 106 may send a message to the electronic commerce system 115 to implement the corresponding action as can be appreciated.

In addition, with reference to FIG. 3C, shown is functionality of the electronic commerce system 115 in responding to a request from a client device 106 based upon a manipulation of a given one of the links as described above. To begin, in box 263 the electronic commerce system 115 identifies the item 173 (FIG. 1) or advertisement 136 (FIG. 1) associated with the request that was received. Thereafter, in box 266, the electronic commerce system 115 takes an appropriate action such as, for example, adding an item 173 to the virtual shopping cart 153 (FIG. 1), adding an item 173 to a wishlist 156 (FIG. 1), or associating an advertisement reference 159 (FIG. 1) with the respective user account 126 (FIG. 1). In addition, it is possible that other action may be taken with respect to the electronic commerce system as described above. Thereafter, the electronic commerce system 115 ends as shown.

Figure 4:
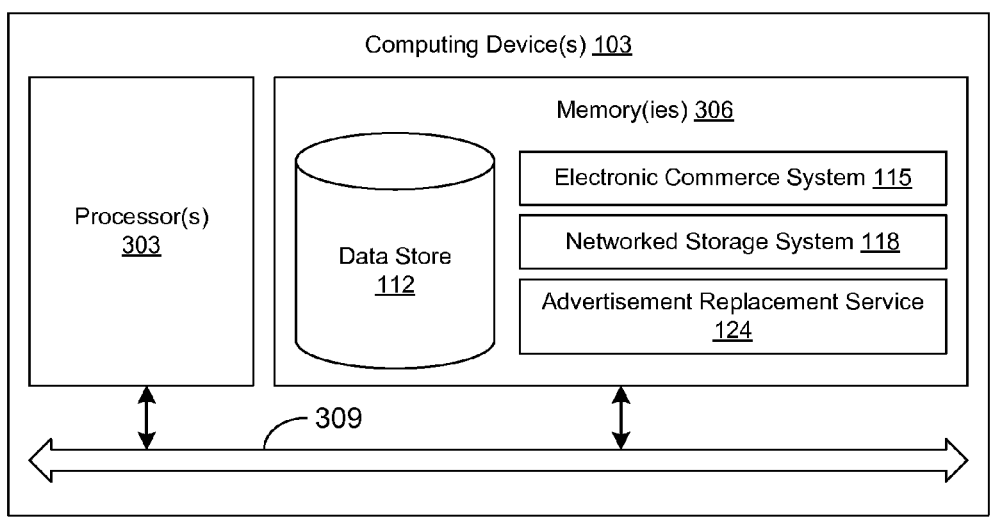
FIG. 4 is a schematic block diagram that provides one example illustration of a computing device employed in the networked environment of FIG. 1 according to various embodiments of the present disclosure.

With reference to FIG. 4, shown is a schematic block diagram of the computing device 103 according to an embodiment of the present disclosure. The computing device 103 includes at least one processor circuit, for example, having a processor 303 and a memory 306, both of which are coupled to a local interface 309. To this end, the computing device 103 may comprise, for example, at least one server computer or like device. The local interface 309 may comprise, for example, a data bus with an accompanying address/control bus or other bus structure as can be appreciated.

Stored in the memory 306 are both data and several components that are executable by the processor 303. In particular, stored in the memory 306 and executable by the processor 303 are the electronic commerce system 115, the networked storage system 118, the advertisement replacement service 124, and potentially other applications. Also stored in the memory 306 may be a data store 112 and other data. In addition, an operating system may be stored in the memory 306 and executable by the processor 303.

It is understood that there may be other applications that are stored in the memory 306 and are executable by the processor 303 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Delphi®, Flash®, or other programming languages.

A number of software components are stored in the memory 306 and are executable by the processor 303. In this respect, the term "executable" means a program file that is in a form that can ultimately be run by the processor 303. Examples of executable programs may be, for example, a compiled program that can be translated into machine code in a format that can be loaded into a random access portion of the memory 306 and run by the processor 303, source code that may be expressed in proper format such as object code that is capable of being loaded into a random access portion of the memory 306 and executed by the processor 303, or source code that may be interpreted by another executable program to generate instructions in a random access portion of the memory 306 to be executed by the processor 303, etc. An executable program may be stored in any portion or component of the memory 306 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 306 is defined herein as including both volatile and nonvolatile memory and data storage components. Volatile components are those that do not retain data values upon loss of power. Nonvolatile components are those that retain data upon a loss of power. Thus, the memory 306 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 303 may represent multiple processors 303 and the memory 306 may represent multiple memories 306 that operate in parallel processing circuits, respectively. In such a case, the local interface 309 may be an appropriate network that facilitates communication between any two of the multiple processors 303, between any processor 303 and any of the memories 306, or between any two of the memories 306, etc. The local interface 309 may comprise additional systems designed to coordinate this communication, including, for example, performing load balancing. The processor 303 may be of electrical or of some other available construction.

Although the electronic commerce system 115, the networked storage system 118, the advertisement replacement service 124, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

The flowcharts of FIGS. 3A, 3B, and/or 3C show the functionality and operation of an implementation of portions of the electronic commerce system 115, the networked storage system 118, and the advertisement replacement service 124. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor in a computer system or other system. The machine code may be converted from the source code, etc. If embodied in hardware, each block may represent a circuit or a number of interconnected circuits to implement the specified logical function(s).

Although the flowcharts of FIGS. 3A, 3B, and 3C show a specific order of execution, it is understood that the order of execution may differ from that which is depicted. For example, the order of execution of two or more blocks may be scrambled relative to the order shown. Also, two or more blocks shown in succession in FIGS. 3A, 3B, and 3C may be executed concurrently or with partial concurrence. Further, in some embodiments, one or more of the blocks shown in FIGS. 3A, 3B, and 3C may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic, service, application, or system described herein, including the electronic commerce system 115, the networked storage system 118, and the advertisement replacement service 124, that comprises software or code can be embodied in any non-transitory computer-readable medium for use by or in connection with an instruction execution system such as, for example, a processor in a computer system or other system. In this sense, the same may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A non-transitory computer-readable medium embodying a program executable in a computing device, comprising:
   code that provides for a networked storage system having a plurality of storage buckets for each one of a plurality of users, wherein at least one of the users causes a broadcast media item to be stored in one of the storage buckets for later consumption;
   code that locates a first advertisement in the broadcast media item;
   code that determines whether the first advertisement is directed to a regional audience by analyzing an audio signal associated with the first advertisement;
   code that identifies a second advertisement based on a purchase history with respect to an electronic commerce system associated with the at least one of the users;
   code that, responsive to the first advertisement being directed to a regional audience, replaces the first advertisement in the broadcast media item with the second advertisement;
   code that associates a link with the second advertisement, the link initiating an action in the electronic commerce system with respect to an item sold through the electronic commerce system; and
   code that sends the broadcast media item to a client computing device.

2. The non-transitory computer-readable medium embodying the program executable in the computing device of claim 1, wherein the program further comprises:
   code that implements the action by:
     associating the second advertisement with at least one user account associated with the at least one of the users; and
     surfacing an item information about the item presented in the second advertisement to the at least one user through a network site presented by the electronic commerce system.

3. The non-transitory computer-readable medium of claim 1, wherein the code that determines whether the first advertisement is directed to a regional audience by analyzing the audio signal associated with the first advertisement further comprises:
   code that applies a speech recognition algorithm to the audio signal to generate a text of the audio signal; and
   code that analyzes the text to determine whether the first advertisement is directed to the regional audience.

4. A system, comprising:
   at least one computing device providing for a networked storage system;
   a broadcast media item stored in the networked storage system in association with an account of a user for later consumption;
   an advertisement system executed in the at least one computing device, the advertisement system further comprising:
     logic that locates a previously existing advertisement in the broadcast media item;

logic that determines whether the previously existing advertisement is directed to a regional audience by analyzing an audio signal associated with the previously existing advertisement;

logic that identifies a replacement advertisement for the previously existing advertisement based at least in part on information associated with the user;

logic that, responsive to previously existing advertisement being directed to a regional audience, replaces the previously existing advertisement in the broadcast media item with the replacement advertisement;

logic that sends the broadcast media item to a client computing device;

wherein the information associated with the user further comprises a purchase history of the user with respect to an electronic commerce system; and wherein the replacement advertisement includes a link that initiates an action in the electronic commerce system with respect to an item sold through the electronic commerce system.

5. The system of claim 4, wherein the broadcast media item is received by the networked storage system from a client over a network, the client being configured to render the broadcast media item.

6. The system of claim 4, wherein the electronic commerce system presents a network site to conduct electronic commerce.

7. The system of claim 6, wherein the link generates and sends a request to the electronic commerce system to add the item to a shopping cart associated with the user.

8. The system of claim 6, wherein the link generates and sends a request to the electronic commerce system to add the item to a list associated with the user.

9. The system of claim 6, wherein the link generates and sends a request to the electronic commerce system to implement an automated purchase of the item by the user.

10. The system of claim 4, wherein the information associated with the user further comprises a browse history of the user with respect to an electronic commerce system.

11. The system of claim 4, wherein the logic that determines whether the previously existing advertisement is directed to a regional audience by analyzing the audio signal associated with the previously existing advertisement further comprises:

logic that applies a speech recognition algorithm to the audio signal to generate a text of the audio signal; and logic that analyzes the text to determine whether the previously existing advertisement is directed to the regional audience.

12. A method, comprising:

storing, by a computing device, a broadcast media item in a networked storage system in association with an account of a user for later consumption;

locating, by the computing device, at least one marker in the broadcast media item that identifies a first advertisement in the broadcast media item;

determining, by the computing device, whether the first advertisement is directed to a regional audience by analyzing an audio signal associated with the first advertisement;

selecting, by the computing device, based at least in part on a purchase history of the user with respect to an electronic commerce system, one of a plurality of second advertisements that targets the user to replace the first advertisement;

including, by the computing device, a link in the one of the second advertisements that initiates an action in the electronic commerce system with respect to an item sold through the electronic commerce system; and replacing, by the computing device, responsive to the first advertisement being directed to a regional audience, the first advertisement with one of the second advertisements in the broadcast media item.

13. The method of claim 12, further comprising sending the broadcast media item to a client computing device in response to a request for the broadcast media item.

14. The method of claim 12, wherein selecting the one of the plurality of second advertisements that targets the user further comprises:

determining a relevance of the second advertisements to the user; and selecting the one of the second advertisements that has been determined to be relevant to the user.

15. The method of claim 14, wherein determining the relevance of the second advertisements to the user further comprises determining a relevance of the second advertisements to the user based at least on a purchase history of the user with respect to an electronic commerce system.

16. The method of claim 14, wherein determining the relevance of the second advertisements to the user further comprises determining a relevance of the second advertisements to the user based at least upon a browse history of the user with respect to an electronic commerce system.

17. The method of claim 14, wherein determining the relevance of the second advertisements to the user further comprises determining a relevance of the second advertisements to the user based at least upon a location of the user.

18. The method of claim 12, wherein the action further comprises placing the item that is presented in the one of the second advertisements in a shopping cart in the electronic commerce system.

19. The method of claim 12, wherein the action further comprises placing the item that is presented in the one of the second advertisements in a list in the electronic commerce system.

20. The method of claim 12, wherein the action further comprises:

storing a reference representing the one of the second advertisements in association with the account of the user; and surfacing an item information about the item presented in the one of the second advertisements to the user through a network page generated by the electronic commerce system.

21. The method of claim 12, wherein determining whether the first advertisement is directed to a regional audience by analyzing the audio signal associated with the first advertisement further comprises:

applying, by the computing device, a speech recognition algorithm to the audio signal to generate a text of the audio signal; and analyzing, by the computing device, the text to determine whether the first advertisement is directed to the regional audience.

22. The method of claim 12, wherein the broadcast media item is received by the networked storage system from a client computing device over a network.

* * * * *